United States Patent [19]

Soden

[11] 4,413,517

[45] Nov. 8, 1983

[54] APPARATUS AND METHOD FOR DETERMINING THICKNESS

[75] Inventor: Robert A. Soden, Trenton, N.J.

[73] Assignee: Sonic Instruments, Inc., Trenton, N.J.

[21] Appl. No.: 219,601

[22] Filed: Dec. 24, 1980

Related U.S. Application Data

[63] Continuation of Ser. No. 61,610, Jul. 30, 1979, abandoned.

[51] Int. Cl.³ ............................................. G01N 29/00
[52] U.S. Cl. ........................................ 73/597; 73/628
[58] Field of Search ................. 73/597, 617, 645, 628, 73/644

[56] References Cited

U.S. PATENT DOCUMENTS

| | | | |
|---|---|---|---|
| 2,667,780 | 2/1954 | Valkenburg | 73/628 |
| 3,504,532 | 4/1970 | Muenow et al. | 73/597 |
| 3,534,609 | 10/1970 | Grenfell et al. | 73/597 |
| 3,720,098 | 3/1973 | Dixon | 73/597 |
| 3,844,163 | 10/1974 | Leo | 73/597 |

*Primary Examiner*—James J. Gill
*Attorney, Agent, or Firm*—Martin Sachs

[57] ABSTRACT

Apparatus and method for measuring the thickness of a test piece by obtaining the acoustic velocity of the test piece where an ultrasonic wave is refracted into the test piece at a first point and the wave travels substantially parallel to the surface and the transit time to a second point where the wave is refracted out of the test piece is measured. The distance between the first and second points is known and the ultrasonic wave is initially transmitted into a member of different acoustic velocity than the test piece to produce the subsurface wave in the test piece.

8 Claims, 3 Drawing Figures

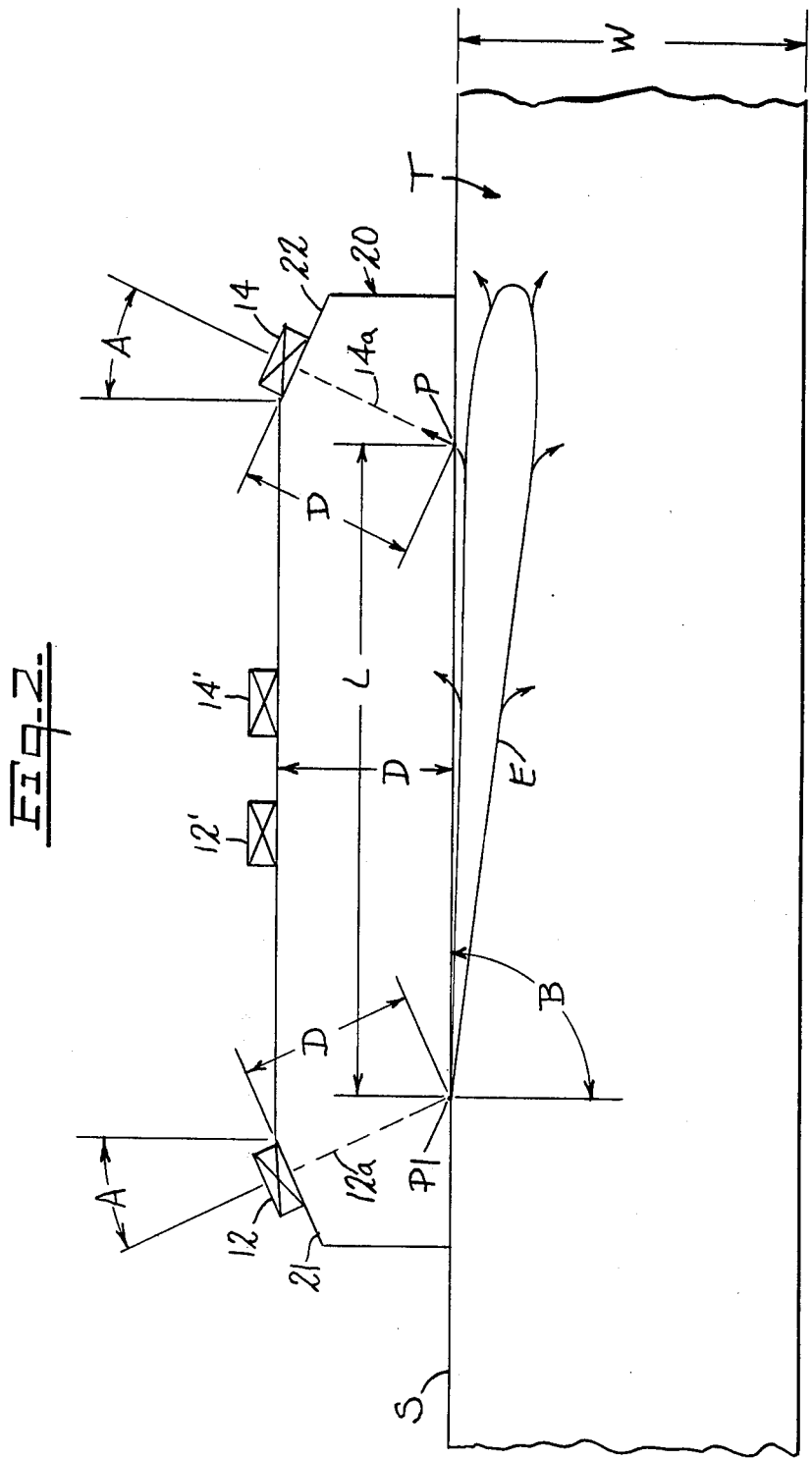

APPARATUS AND METHOD FOR DETERMINING THICKNESS

This is a continuation of application Ser. No. 06/061,610, filed July 30, 1979, now abandoned.

BACKGROUND OF THE INVENTION

1. Field of the Invention

This invention relates to ultrasonic testing and more particularly relates to non-destructive ultrasonic testing technique for the measurement of thickness of a test piece which includes determination of the velocity of ultrasonic energy in the test piece.

2. Discussion of the Relevant Art

There are many ultrasonic instruments which have been used for measuring the thickness from one side of the material with the pulse-echo method. Such instruments require a calibration technique using test blocks of similar material or by knowing the actual acoustic velocity of the material being measured, and then calibrating the instrument correspondingly.

One method requires the use of two or more test samples having the same or similar acoustic velocity as the material to be measured. These test samples have known thicknesses and must cover the range of measurement expected. The readout of the thickness measuring device is calibrated by first setting the zero control on the thinner of the two test pieces, and then setting the span control on the thicker of the two test pieces.

Another calibration technique uses the fact that the ultrasonic thickness measuring instrument can be calibrated in terms of acoustic velocity. If the acoustic velocity of the material being measured is known, this information can be set into the instrument and only one test piece is required to achieve a zero offset.

Material or structure such as pressure containment vessels without two exposed and opposed measurable surfaces are not presently measurable for velocity. The acoustic velocity is a function of the square root of the ratio of the bulk elastic modulus of the test material to its density. In some materials, particularly cast iron, the acoustic velocity may vary from sample to sample plus or minus 15% of a nominal value which is generally considered to be $2.0 \times 10^5$ inches per second. If the actual acoustic velocity of the material under test is not known, thickness testing by the ultrasonic pulse echo method using a nominal value of acoustic velocity may be quite erroneous.

Accordingly, the present invention provides a new and improved technique for determining the actual acoustic velocity of material to be tested where access to the material may be had from only one side thereof and thereafter measuring the thickness of the material.

Ultrasonic test equipment of the pulse-echo type generally may be considered to make thickness measurements using the velocity factor of the material as a base reference. Generally, in such equipment, the time is measured between a transmitted pulse and the received echo. This may be achieved by generating a rectangular waveform whose duration is a measure of the transit time of the acoustic wave between opposed surfaces. Knowing the transit time and the acoustic velocity in the test material then leads to a simple arithmatic determination of the thickness of the material. Most ultrasonic thickness gauging instruments operate on this theory. Typical instruments are the DIGI-SONIC 502 manufactured by Sonic Instruments, Inc. of Trenton, N.J. and also a Model 220, manufactured by the same company. These instruments are portable, designed for field testing, and at least one will be partially described in conjunction with the invention.

SUMMARY OF THE INVENTION

Briefly stated, the invention in, one form thereof comprises apparatus and the steps of positioning a first ultrasonic transducer at an angle to the surface of the test piece such that the angle of refraction of the ultrasonic wave entering the test piece is near a first critical angle and creates a longitudinal subsurface wave in the test piece; positioning a second receiving transducer at the same distance and at the same angle from the test piece so that the axes of the transducers intersect the test pieces to define a known dimension. Then, the first transducer is excited and an ultrasonic wave entering the test piece is refracted to be a longitudinal subsurface acoustic wave. As this wave propagates along the test piece it decays, emitting energy which is refracted back to the second transducer where the second transducer axis intersects the test piece. The time of propagation is thus measured and since the distance between the intersecting axes is known, the acoustic velocity in the test piece is determined. When the acoustic velocity in the test piece is determined, the instrument may then be calibrated for this velocity, and the thickness of the test piece determined by the known pulse echo technique.

An object of this invention is to provide a new and improved method and apparatus for determining the acoustic velocity of a test piece and the thickness thereof.

BRIEF DESCRIPTION OF THE DRAWING

In order that the invention may be more fully understood, it will now be described by way of example, with reference to the accompanying drawing in which:

FIG. 2 is pictorial representation of a piece of material having one surface available for a thickness measurement with the ultrasonic measuring transducers coupled to said surface.

DESCRIPTION OF THE PREFERRED EMBODIMENT

Figure 1:
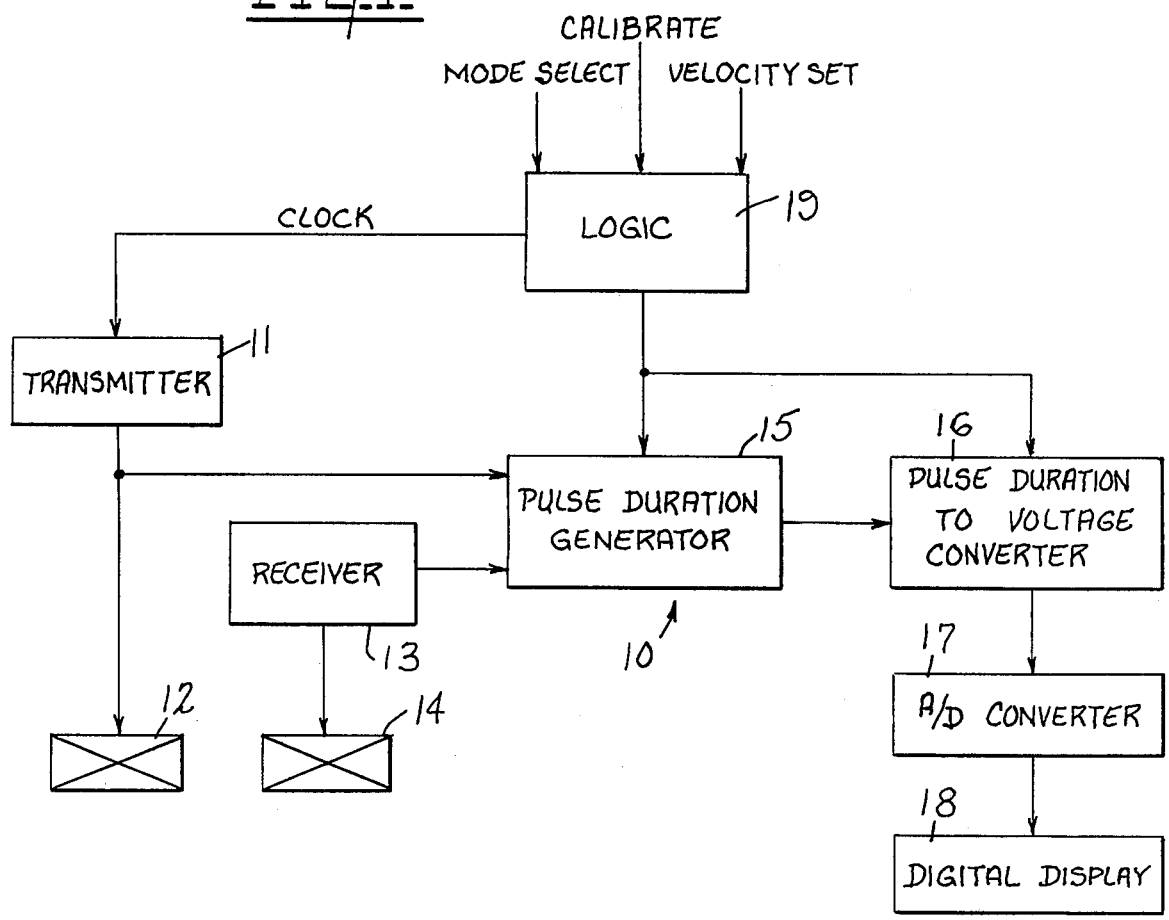
FIG. 1 is a simplified block diagram of an ultrasonic measuring system in which the principles of the present invention may be utilized.

An ultrasonic measurement system 10 in which the invention may be utilized is exemplified in block form in FIG. 1 and is shown in a two-transducer mode of operation. System 10 comprises a transmitter 11 adapted to excite a first ultrasonic transducer 12, and a receiver 13 adapted to receive a reflected or transmitted ultrasonic wave from a second transducer 14. The transmitted pulse as well as a received pulse are applied to a pulse duration generator 15 which will generate a pulse proportional to the time between the transmitted pulse and the received signal. The output of the pulse duration generator is applied to a pulse duration to voltage converter 16 which generates a voltage proportional in magnitude to pulse duration. The output of voltage converter 16 is applied to an analog to digital converter 17 which will supply a binary coded decimal signal to a digital display 18, which is conventionally of the seven bar character type. The system also includes an arithmatical logic network 19 in which various intelligence may be set into the instrument and the instrument calibrated. For example, in the mode selection, the operator will set the unit either to read out distance or velocity. When distance is to be measured, the known velocity of the material under test will be set into the instrument. Also provided is a calibration adjustment which permits among other things certain pulses to be ignored or measurement selected in accordance with pulses occurring on a known relative time basis. The instrument as shown is in the dual transducer mode but for straight thickness testing may be utilized in a single transducer mode; that is, in the pulse echo mode of operation. An instrument generally as shown is marketed by Sonic Instruments, Inc. of Trenton, N.J. under the designation DIGI-SONIC 502.

FIG. 2 exemplifies a piece of test material T to which there is only upper surface S availability. An adapter member referred to as a wedge 20 is acoustically coupled to the upper surface S of the piece T by a coupling fluid. The wedge 20 may be of a plastic material known as methyl methacrylate or polystyrene, or any other homogeneous material having lower acoustic velocity than test piece T. The wedge is formed with spaced apart surfaces 21 and 22 which are disposed at predetermined angles. This angle is selected to provide a complementary angle A of the axes of transducers 12 and 14 with the vertical. The angle A is close to a first critical angle and is so chosen that upon refraction of the ultrasonic wave at the surface S it will produce a longitudinal subsurface wave generally indicated by the envelope E. This wave will radiate and decay as it propagates in the test piece T. At a point P there will be energy refracted back into wedge 20 at the same angle which will be received by transducer 14. The distance between the point P and P1 where the ultrasonic energy is first refracted into the test piece T is a known dimension as is the distance from the transducer 12 to point P1 and point P to transducer 14 on the transducer axes. The distance between P1 and P is the distance between the points of intersection of the axes 12a and 14a of transducers 12 and 14, respectively, with the bottom of wedge 20. This is a known distance L. The distance D between transducer 12 and point P1, and transducer 14 and point P are known to be the distance D which is preferably equal at each end of wedge 20.

The angle A between the normal to the test piece T and the axes of the transducers is selected to be close to the first critical angle of diffraction of the ultrasonic wave into the test piece; that is, upon striking the test piece T, the ultrasonic wave from transducer 12 will create a subsurface wave substantially parallel to the surface S of test piece T, and propagate generally as shown by the envelope E.

The acoustic velocity of materials vary dependent on the bulk elastic modulus and the density of the material. Thus, as the ultrasonic energy or wave moves from one material to another there is a change in velocity of propagation and hence refraction of the energy at the interface of the different materials.

This phenomena is similar to the refraction of light at a lens surface. There is an angle of criticality beyond which the wave does not travel into the material, but will become a subsurface wave substantially parallel to the surface.

The critical angle A may be calculated from Snell's law considering the angle B to be 90° and using the nominal value of acoustic velocity for a given material as follows:

$$\frac{\sin A}{\sin B} = \frac{V1}{V2}$$

where
V1 is the longitudinal acoustic velocity of the material of the wedge,
V2 is the longitudinal nominal acoustic velocity of the material under test,
A is the angle of the ultrasonic energy in the wedge with respect to the vertical, and
B is the refracted angle in the material under test.
Since B is 90°, Sin B = 1.
Therefore, $$V2 = \frac{V1}{\sin A} \text{ and } \sin A = \frac{V1}{V2}$$

Where the wedge is a methyl methacrylate (Lucite) typical angles A are

| Material | Nominal Velocity | Angle A |
|---|---|---|
| Aluminum | $2.5 \times 10^5$ inches/sec. | 25° |
| Steel | $2.3 \times 10^5$ inches/sec. | 27° |
| Cast Iron | $1.8 \times 10^5$ inches/sec. | 35° |

The velocity in methyl methacrylate of the type identified by the trademark Lucite is 1.05 by $10^5$ inches/second.

The velocity in the wedge will determine the angle A. Where the wedge is polystyrene, the angle A is as follows for various materials:

| Angle A | Material and Velocity | |
|---|---|---|
| 22° | Aluminum | $2.4 \times 10^5$ inches/sec. |
| 24° | Steel | $2.3 \times 10^5$ inches/sec. |
| 28° | Cast Iron | $2.0 \times 10^5$ inches/sec. |

The velocity in the wedge must be different than that in the test piece in order to obtain a critical angle and produce a subsurface wave.

Figure 3:
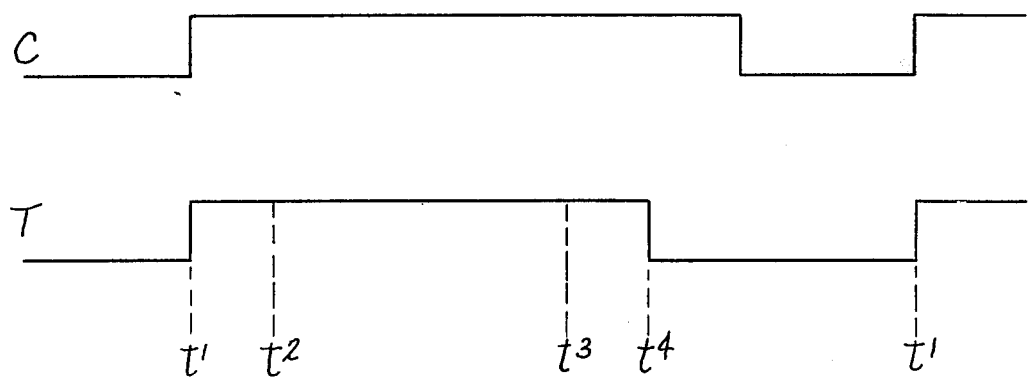
FIG. 3 is a typical timing wave form diagram of the system disclosed in FIG. 1.

FIG. 3 is exemplary of timing waveforms in the system of FIG. 1. At time $t_1$, a clock signal C goes high energizing transducer 12 which produces an ultrasonic wave in the wedge. At time $t_4$, the transmitted and refracted wave is detected by transducer 14. The interval between times $t_1$ and $t_4$ is the total transit time of the ultrasonic energy in the wedge 20 and the test piece T. Since the velocity of the wave in the wedge $V_1$ is known as is the distance D, the instrument may be calibrated to ignore the intervals $t_1$ to $t_2$ and $t_3$ to $t_4$ in the velocity readout.

In any event, the acoustic velocity $V_2$ in the test piece may be calculated from a time basis as follows:

$$t_4 - t_1 = (t_2 - t_1) + (t_3 - t_2) + (t_4 - t_3)$$

and $$t_4 - t_1 = \frac{2D}{V_1} + \frac{L}{V_2}$$

where $V_2$ is the acoustic velocity in the test piece 20.

$$V_2 = \frac{L}{(t_4 - t_1) - \frac{2D}{V_1}}$$

since $2D/V_1 = (t_2 - t_1) + (t_4 - t_3)$ $$V_2 = \frac{L}{t_3 - t_2}$$

Ultrasonic waves can be propagated to some extent in any elastic material. This traveling of sound waves occurs as a displacement of the successive elements of the medium. In any elastic medium, there is a restoring force which tends to restore each element of material back to its original position after movement. Since all elastic substances also possess inertia, the particle continues to move after it returns to the location from which it started, and finally reaches another location past the original one. It will then continue to bounce back and forth with constantly diminishing amplitude. The particles of the material will execute different movements, or orbits, as the wave passes through them. The overall effect is to attenuate the strength of the ultrasonic energy traveling through this medium.

Longitudinal, or compression, waves exist when the motions of the particles of a medium are parallel to the direction of the waves. It is the type used when employing the straight beam technique of testing. This wave is most often used in ultrasonics since it will travel in liquids or solids, and is easily generated and detected. Longitudinal waves have a high velocity of travel in most materials, and the wavelengths in common materials are usually very short in comparison with the cross-sectional area of the crystal used. This property allows the ultrasonic energy to be directed into a sharp beam.

When shear waves are generated in a material, the movements of the particles in the medium are at right angles to the direction of wave propagation. They usually travel in a beam of small cross-section. Shear waves have a velocity that is approximately half of that of longitudinal waves. The shear wave is the type that is generated when using an angle beam technique of testing for defects.

The velocities and angles given supra are for generation of a longitudinal wave as opposed to a shear wave.

The angle A may be exceeded over the values given up to a point where the received output is substantially reduced. Since the longitudinal wave is used to measure thickness, it is preferred to use the longitudinal wave for velocity measurement. Therefore, the angle A is preferably not increased over the first critical angle to an angle where a subsurface shear wave is generated substantially parallel to the surface. In producing the longitudinal subsurface wave at or above the first critical angle A, there will also be a refracted shear wave in the test piece. However, the refracted shear wave will not become substantially parallel to the surface until the second critical angle is reached.

The wedge is preferably constructed so that once the acoustic velocity of the test piece is known the thickness of the test piece may be quickly measured. The height of the wedge is the same dimension as the distance D. Since the instrument is still compensated for the distance D in the wedge, the instrument may be set to the thickness mode and the thickness W of the test piece measured as shown using the transducers 12' and 14' on top of the wedge. Alternately, the thickness may be measured using only one transducer in the pulse echo mode.

In the thickness mode the dimension W is $$W = \frac{V_2 t_o}{2}$$

where $t_o$ is the round trip transit time in test piece T and $V_2$ has previously been determined. The bottom surface of the wedge 20 may be contoured in accordance with the surface of the test piece.

Where the instrument used is of the pulse echo type; that is, the time between pulse and echo is a measure of the round trip transit time and the arithmatical logic is designed accordingly, a factor of two must be introduced for measuring between the transmitted pulse and received pulse by separate transducers.

It may thus be seen that the objects of the invention set forth as well as those made apparent from the foregoing description are efficiently attained. While a preferred embodiment of the invention has been set forth for purposes of disclosure, modification to the disclosed embodiments of the invention as well as other embodiments thereof may occur to those skilled in the art. Accordingly, the appended claims are intended to cover all embodiments of the invention and modifications to the disclosed embodiment which do not depart from the spirit and scope of the invention.

What is claimed is:

1. A method of measuring the thickness of a test piece with sonic energy, comprising the steps of:
    (A) providing a member of different material than said test piece, said member having;
        (i) spaced apart angular surfaces approaching an angle complementary to the first critical angle of refraction of said test piece, each said angular surface adapted to receive a transducer,
        (ii) an upper surface disposed between said angular surfaces and
        (iii) a bottom surface;
    (B) acoustically coupling said member to the surface of said test piece;
    (C) positioning a first transducer upon one of said test piece angular surfaces such that the critical angle of refraction of said test piece is approached;
    (D) positioning a second transducer upon the other of said test piece angular surfaces at the same critical angle from said test piece surface so that the axes of said first and second transducers intersect said test piece surface to define a known dimension along said test piece surface;
    (E) exciting said first transducer to provide a sonic subsurface wave in said test piece substantially parallel to said test piece surface;
    (F) measuring the time of transmission of said sonic wave between said first and said second transducers;
    (G) calculating the velocity of said sonic wave in said test piece;
    (H) positioning a third transducer on said member upper surface, the distance between said member upper surface and said member bottom surface being equal to the distance of said first transducer, measured along the axis of said first transducer, to the intersection of said first transducer axis with said member bottom surface;

(I) exciting said third transducer to transmit an ultrasonic pulse in said member and said test piece;

(J) detecting an echo pulse from the bottom side of said test piece; and (K) measuring the thickness of said test piece by determining the round trip transit time of a sonic pulse and echo in said test piece.

2. The method according to claim 1 further including a fourth transducer disposed on said member upper surface adapted to receive said echo pulse used for measuring said test piece thickness.

3. An apparatus for measuring the thickness of a test piece, comprising:
- (a) a member having;
  - (i) spaced apart first and second angled surfaces arranged to receive first and second ultrasonic transducers, said angular surfaces being at equal angles approaching an angle complementary to the first critical angle of refraction of said test piece,
  - (ii) an upper surface disposed between said angular surfaces, and
  - (iii) a bottom surface;
- (b) first, second and third ultrasonic transducers, said first and said second transducers being disposed on said first and said second angular surfaces, respectively, having axes which intersect the bottom surface of said member to define a predetermined dimension along said test piece surface, said third transducer being disposed on said member upper surface, the distances of each said transducer to said member bottom surface, as measured along each said transducer axis being the same, the axes of said first and said second transducers defining an angle with the normal to said member bottom surface approaching a first critical angle of diffraction of the ultrasonic energy between said member and said test piece;
- (c) first means for calculating the velocity of a sonic subsurface wave traveling substantially parallel to said test piece surface generated by said first transducer and received by said second transducer; and
- (d) second means for calculating the thickness of said test piece by measuring the round trip transit time of an ultrasonic pulse generated by said third transducer and the acoustic echo pulse returning from the bottom side of said test piece and received by said third transducer.

4. The device of claim 3 where the bottom surface of said member is contoured to be complementary to a given test piece.

5. An apparatus according to claim 3 further including a fourth transducer disposed upon said member upper surface, said fourth transducer receiving said echo pulse.

6. An apparatus according to claim 3 further including means for displaying said thickness measurement.

7. In an apparatus for measuring with ultrasonic energy the thickness of a material under test having a means for calculating the thickness of said material by utilizing a first transducer to determine the transit time of an ultrasonic pulse and echo in said test piece and displaying said information, the improvement of obtaining the acoustic velocity in said test piece, comprising the steps of:
- (a) positioning a second transducer at an angle to one surface of said test piece such that the critical angle of refraction is approached;
- (b) positioning a third transducer at the same angle from said test piece surface so that the axes of said second and third transducers intersect said test piece surface to define a known dimension along said surface;
- (c) exciting said second transducer to produce a sonic subsurface wave in said test piece substantially parallel to said test piece surface;
- (d) measuring the time of transmission of said sonic wave between said second and said third transducers;
- (e) calculating the velocity of said sonic wave in said test piece; and
- (f) positioning said first, said second and said third transducers so that the distance from each transducer, measured along its respective axis, to said test piece surface is the same.

8. An apparatus according to claim 7 further including the step of:
- (g) providing a fourth transducer disposed the same distance, measured along its axis, from said test piece surface as said first, said second and said third transducers, said fourth transducer being used to receive said echo caused by exciting said first transducer.

* * * * *